United States Patent [19]

Aikawa et al.

[11] Patent Number: 5,155,638

[45] Date of Patent: Oct. 13, 1992

[54] COMPATIBLE DATA STORAGE APPARATUS FOR USE WITH DISK ASSEMBLIES OF TWO OR MORE DIFFERENT STORAGE CAPACITIES

[75] Inventors: Shinichi Aikawa, Mitaka; Yoshiaki Sakai, Higashikurume, both of Japan

[73] Assignee: Teac Corporation, Tokyo, Japan

[21] Appl. No.: 549,765

[22] Filed: Jul. 9, 1990

[30] Foreign Application Priority Data

Jul. 14, 1989 [JP] Japan .................. 1-182304

[51] Int. Cl.⁵ .................. G11B 19/12; G11B 23/42; G11B 19/10
[52] U.S. Cl. .................. 360/69; 360/99.01; 360/137
[58] Field of Search .......... 360/69, 71, 73.01, 73.0386, 360/97.01, 99.01, 99.02, 99.06, 137, 133

[56] References Cited

U.S. PATENT DOCUMENTS

| | | | |
|---|---|---|---|
| 3,843,967 | 10/1974 | Mulvany | 360/133 |
| 4,339,776 | 7/1982 | Länger et al. | 360/69 |
| 4,658,307 | 4/1987 | Tsuyuguchi et al. | 360/69 |
| 4,677,510 | 6/1987 | Shoji et al. | 360/71 |
| 4,811,122 | 3/1989 | Kido et al. | 360/69 |
| 4,843,490 | 6/1989 | Hasragushi | 360/69 |
| 4,891,727 | 1/1990 | Sato et al. | 360/137 |
| 4,897,736 | 1/1990 | Saito | 360/121 |
| 4,901,169 | 2/1990 | Hamaoka et al. | 360/66 |
| 4,995,029 | 2/1991 | Kobayashi et al. | 360/133 |

Primary Examiner—John H. Wolff
Assistant Examiner—Craig A. Renner
Attorney, Agent, or Firm—Woodcock Washburn Kurtz Machiewicz & Norris

[57] ABSTRACT

A compatible disk drive is disclosed which is capable of writing and reading data on either of first, second and third interchangeable flexible magnetic disk cartridges of different storage capacities at first, second and third prescribed data transfer rates, respectively. The first and second disk cartridges have a first and a second capacity discriminate window, respectively, formed in different prescribed positions in their housings by way of contradistinction from each other and from the third disk cartridge which has no capacity discriminate window. The disk drive customarily employs two disk sensors for discriminating among the first, second and third disk cartridges. The invention ultilizes the binary outputs from the two disk sensors for the detection of the loading of any of the three types of disk cartridges, thereby dispensing with an additional sensor heretofore employed for that purpose.

2 Claims, 4 Drawing Sheets (A) FIRST DISK SENSOR 34
(B) SECOND DISK SENSOR 36
(C) DISK DETECTOR CIRCUIT 92

COMPATIBLE DATA STORAGE APPARATUS FOR USE WITH DISK ASSEMBLIES OF TWO OR MORE DIFFERENT STORAGE CAPACITIES

BACKGROUND OF THE INVENTION

Our invention relates to a compatible data storage apparatus capable of selective use with interchangeable record disk assemblies of two or more different storage capacities at as many different data transfer speeds. We envisage flexible magnetic disk cartridges as a typical form of disk assemblies for use with the data storage apparatus of our invention, although we do not wish our invention to be limited to this particular application.

Three and a half inch flexible magnetic disks are commercially available today with storage capacities of one, two, and four megabyte. All these disks of the different capacities are offered in cartridge form, with plastic housings of the same shape and size (FIGS. 1-3). The two and four megabyte disk cartridges, however, have markings in the form of small, square openings or windows formed in different predetermined positions in their housings. These windows are intended to enable the associated compatible disk drive to discriminate between the two and four megabyte disk cartridges. We will therefore refer to the windows as the capacity discriminate windows hereinafter in this specification. The one megabyte disk cartridge has no capacity discriminate window and so is distinguished from the two and four megabyte disk cartridges.

In a compatible disk drive for use with at least the two and four megabyte disk cartridges, two disk sensors have customarily been employed for discriminating between the two different types of disk cartridges by detecting the capacity discriminate windows in their housings. It has also been customary for the compatible disk drive to incorporate two additional sensors. One of these has been used for finding whether the write protect window in each disk cartridge is open or closed, and the other for detecting the loading of either type of disk cartridge in the disk drive. The detection of the loading of a disk cartridge in the disk drive is essential for the production of the disk change signal and "ready" signal which are both standard in the disk drive art.

Thus, conventionally, at least four sensors have been used in the compatible disk drive of the type under consideration. Being constituted of Microswitches (trade name) or optical devices, such sensors have made the disk drive complex and expensive in construction, difficult of assemblage, unreliable in operation.

SUMMARY OF THE INVENTION

We have hereby invented how to reduce the number of sensors heretofore employed in a compatible disk drive of the kind defined.

Briefly, our invention may be summarized as a compatible data storage apparatus having a transducer for writing and reading data on first and second replaceable disk assemblies of different storage capacities at first and second data transfer rates, respectively, under the control of a host system, each disk assembly having a rotating disk enclosed in a housing, the first and second disk assemblies having a first and a second marking, respectively, formed in different prescribed positions on the housings thereof by way of contradistinction from each other.

More specifically, the invention provides, in the compatible data storage apparatus outlined above, the improvement comprising a first disk sensor for sensing the loading of the first disk assembly in the apparatus by detecting the first marking thereof, the first disk sensor providing a binary output indicative of the presence or absence of the first marking, and a second disk sensor for sensing the loading of the second disk assembly in the apparatus by detecting the second marking thereof. The first and second disk sensor provides binary outputs indicative of the presence or absence of the first and second markings, respectively. There is additionally provided a disk detector circuit connected to the first and second disk sensors for detecting the loading of either of the first and second disk assemblies in the apparatus on the basis of the binary outputs from the first and second disk sensors.

Thus, according to our invention, the two disk sensors heretofore employed solely for discriminating between the two different types of interchangeable disk assemblies are also utilized for the detection of the loading of either of the first and second disk assemblies in the apparatus. No additional sensor is required for the latter purpose. Preferably, also included is a mode means for inputting from the host system a mode signal indicative of a first mode in which data is written and read at the first data transfer rate, and a second mode in which data is written and read at the second data transfer rate. Connected to both the first and second disk sensors and the mode means is a disk discriminator circuit for comparing the outputs therefrom in order to ascertain if the mode indicated by the mode signal matches the disk assembly that has been loaded in the apparatus, the comparison circuit means sending to the host system a signal representative of the results of such comparison.

According to a further feature of our invention, the disk detector circuit can take the form of a simple AND gate. It will therefore be understood that our invention requires but one AND gate in place of the conventional sensor for the detection of the loading of either of the first and second disk assemblies. We have thus succeeded in making the compatible data storage apparatus simpler and less expensive in construction, easier of assemblage, and more reliable in operation than heretofore.

The above and other features and advantages of our invention and the manner of realizing them will become more apparent, and the invention itself will best be understood, from a study of the following description and appended claims, with reference had to the attached drawings showing some preferred embodiments of our invention.

DESCRIPTION OF THE PREFERRED EMBODIMENTS

We will now describe our invention in detail as embodied in a compatible data processing system for use with three different types of flexible magnetic disk cartridges available on the market. We will first briefly describe the constructions of the disk cartridges and then proceed to the description of the data processing system.

Flexible Magnetic Disk Cartridges

Figure 1:
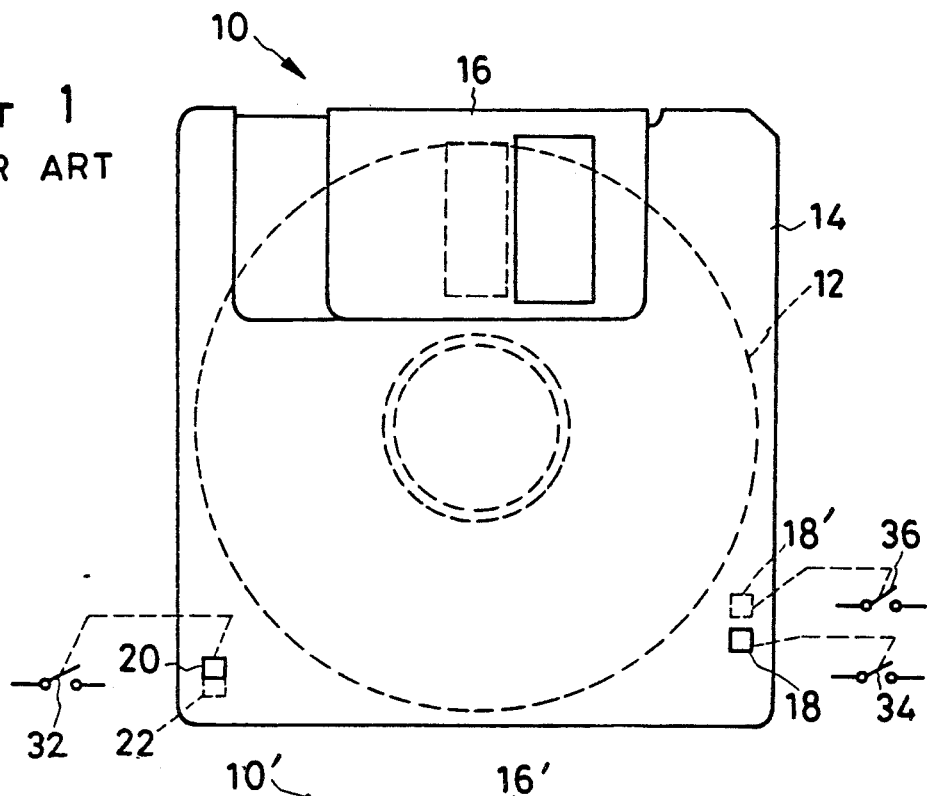
FIG. 1 is a plan view of a first type of flexible magnetic disk cartridge for use in the practice of our invention.
Figure 2:
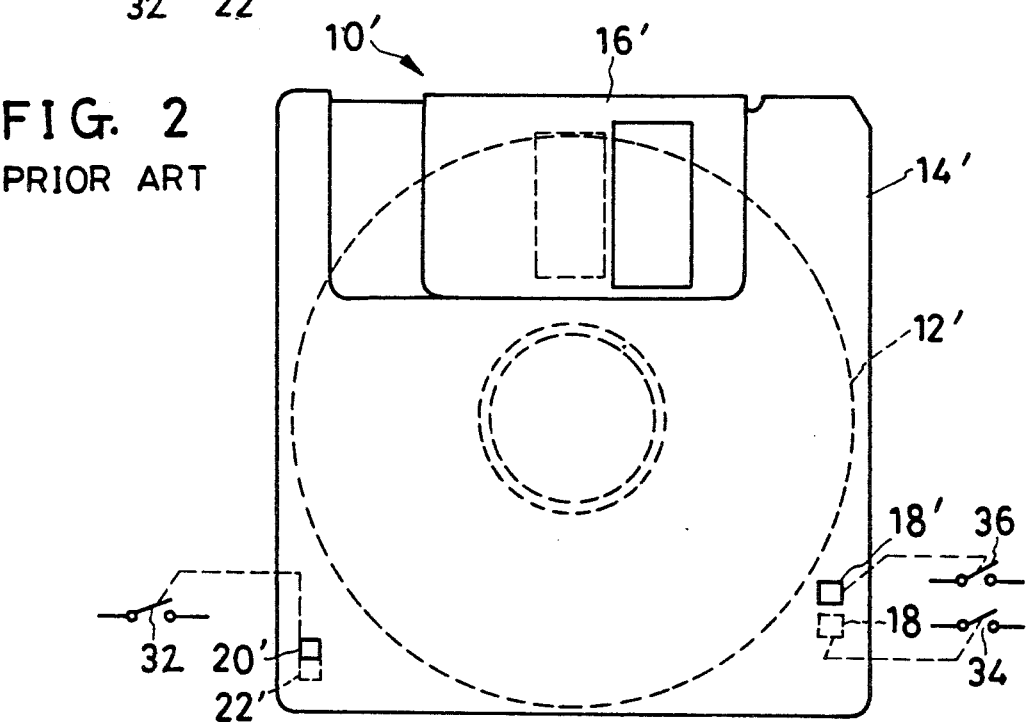
FIG. 2 is a plan view of a second type of flexible magnetic disk cartridge for use in the practice of our invention.
Figure 3:
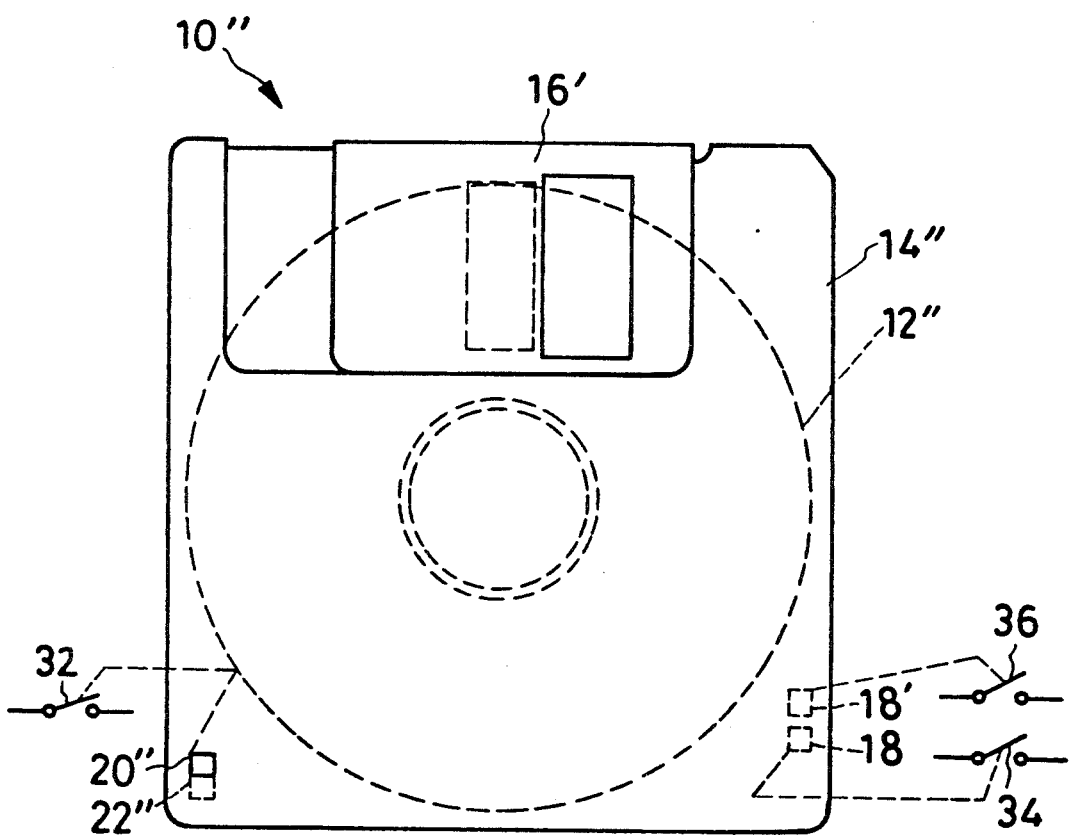
FIG. 3 is a plan view of a third type of flexible magnetic disk cartridge for use in the practice of our invention.

As illustrated in FIGS. 1-3, the three types of interchangeable flexible magnetic disk cartridges 10, 10' and 10" are substantially of identical make, having flexible magnetic disks 12, 12' and 12" rotatably enclosed in generally flat housings 14, 14' and 14" of approximately square shape as seen in a plan view as in these drawings. The housings 14, 14' and 14" have sliding covers 16, 16' and 16" mounted astride one edge thereof. The sliding covers 16, 16' and 16" are shown closed. When the disk cartridges 10, 10' and 10" are loaded in the associated compatible disk drive to be disclosed subsequently, the covers 16, 16' and 16" are to be opened automatically to expose radial portions of the magnetic disks 12, 12' and 12".

We understand that the FIG. 1 disk cartridge 10 is of the two megabyte capacity, the FIG. 2 disk cartridge 10' of the four megabyte capacity, and the FIG. 3 disk cartridge 10" of the one megabyte capacity. The sole mechanical difference between the two and four megabyte disk cartridges 10 and 10' is that they have capacity discriminate markings or windows 18 and 18' formed in different positions through their housings 14 and 14' adjacent one corner thereof. We have made clear the positional difference between the capacity discriminate windows 18 and 18' by indicating by the phantom outline in each of FIGS. 1 and 2 the capacity discriminate window formed in the disk cartridge shown in the other of these drawings. The one megabyte disk cartridge 10" of FIG. 3 differs from the two and four megabyte disk cartridges 10 and 10' only in that the former has no capacity discriminate window. In FIG. 3, again, we have indicated by the broken outlines the positions of the capacity discriminate windows 18 and 18' in the two and four megabyte disk cartridges 10 and 10'.

Additionally, the housings 14, 14' and 14" of all the disk cartridges 10, 10' and 10" have write protect windows 20, 20' and 22" which can be opened or closed by covers 22, 22' and 22". The write protect windows 20, 20' and 20" are to be opened when the recordings on the associated magnetic disks 12, 12' and 12" are to be protected against erasure or overwriting.

Data Processing System

Figure 4:
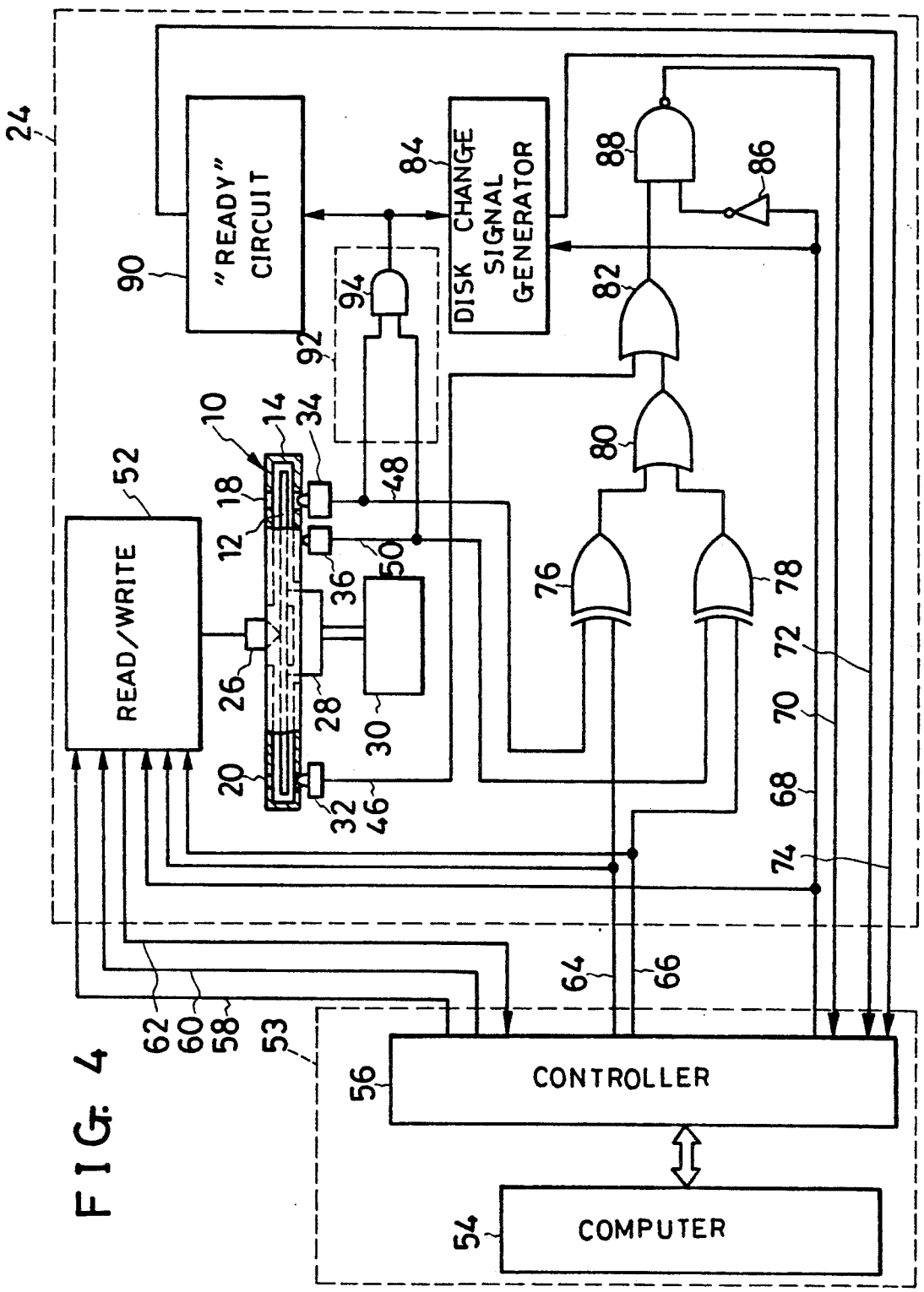
FIG. 4 is a block diagram of a compatible data processing system for use with the first, second and third types of disk cartridges of FIGS. 1-3 in accordance with the principles of our invention.

With reference to FIG. 4 the compatible data processing system illustrated therein includes a disk drive 24 having a transducer or magnetic read/write head 26 for data transfer with any of the disk cartridges 10, 10' and 10". We have shown the two megabyte disk cartridge 10 of FIG. 1 loaded in position within the disk drive 24 by way of example, it being understood that the other two disk cartridge 10' and 10" of FIGS. 2 and 3 can be likewise loaded in and unloaded from this same disk drive. The representative disk cartridge 10 is replaceably mounted on a turntable 28 which in turn is coupled directly to an electric disk drive motor 30. The disk drive motor 30 functions to impart rotation to the magnetic disk 12 within the housing 14 of the disk cartridge 10 in order to create relative scanning motion between the disk and the transducer 26.

At 32 is shown a write protect sensor for finding whether the write protect window 20, 20' or 20" in the loaded disk cartridge 10, 10' or 10' is open or closed. We have shown the write protect sensor 32 as a Microswitch, complete with a switch actuator which is to be received in the write protect window, if it is open, of the disk cartridge loaded in position in the disk drive 24. The switch actuator is to be depressed if the write protect window is closed. The write protect sensor 32 is off, providing a high output, if the write protect window is open, and on, providing a low output, if the write protect window is closed. The high output means that the loaded disk cartridge is protected, and the low output means that it is not.

Two disk sensors 34 and 36, also shown as Microswitches, are provided for sensing the loading of either of the three types of disk cartridges 10, 10' and 10" in the disk drive 24. The position of the disk sensors 34 and 36 are such that when the two and four megabyte disk cartridges 10 and 10' are loaded in position within the disk drive 24, the capacity discriminate windows 18 and 18' in their housings 14 and 14' come opposite the disk sensors 34 and 36, respectively, thereby receiving their switch actuators. Therefore, the first disk sensor 34 is off, providing a high output, only when the two megabyte disk cartridge 10 is loaded in the disk drive 24. The second disk sensor 36 is off, providing a high output, only when the four megabyte disk cartridge 10' is loaded in the disk drive 24. Both first and second disk sensors 34 and 36 are turned on, providing low outputs, only when the one megabyte disk cartridge 10" is loaded in the disk drive 24.

Figure 5:
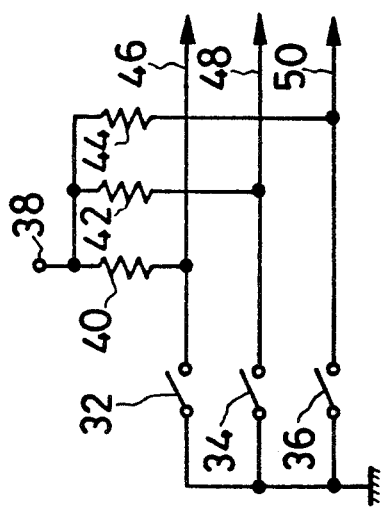
FIG. 5 is a schematic diagram of an electric circuit for the sensors used in the FIG. 4 system.

FIG. 5 is a diagram of a preferred electric circuit associated with the Microswitches constituting the write protect sensor 32 and disk sensors 34 and 36. The three Microswitches 32, 34 and 36 are normally open and are all connected between ground and output lines 46, 48 and 50, respectively. A common positive supply terminal 38 is also connected to the output lines 46, 48 and 50 via resistors 40, 42 and 44, respectively. Thus, when the Microswitches 32, 34 and 36 are closed, low outputs are provided as aforesaid on the output lines 46, 48 and 50.

With reference back to FIG. 4 the transducer 26 is electrically connected to a read/write circuit 52. This read/write circuit conventionally comprises read circuit means for producing read data in response to the output from the transducer. Also, the read/write circuit 52 has write circuit means for supplying to the transducer 26 a write current representative of write data to be recorded on the disk 12, 12' or 12" of the loaded disk cartridge 10, 10' or 10".

As is also conventional in the art, the disk drive 24 is interfaced with a host system 53 comprising a computer 54 and a disk drive controller 56. The disk drive controller 56 is connected to the disk drive 24 via a WRITE DATA line 58, a WRITE GATE line 60, a READ DATA line 62, a pair of MODE lines 64 and 66, a DRIVE SELECT line 68, a WRITE PROTECT line 70, a DISK CHANGE line 72 and a "READY" line 74.

The WRITE DATA line 58 is for the delivery, from controller 56 to read/write circuit 52, of the data to be written on the disk 12, 12' or 12" of the disk cartridge 10, 10' or 10". The write data is sent at a different predetermined rate depending upon which of the disk cartridges 10, 10' and 10" is loaded in the disk drive 24.

The WRITE GATE line 60 is for the delivery of the WRITE GATE signal from controller 56 to read/write circuit 52. The WRITE GATE signal has a low state for permitting writing and a high state for inhibiting writing.

The READ DATA line 62 is for the delivery of the read data from read/write circuit 52 to controller 56.

The pair of MODE lines 64 and 66 transmits from controller 56 to disk drive 24 a two bit MODE signal indicative of any of three data transfer modes in which data is to be read and written at rates matching the three disk cartridges 10, 10' and 10". The first MODE line 64 is high, and the second MODE line 66 low, to indicate a first data transfer mode matching the two megabyte disk cartridge 10. The first MODE line 64 is low, and the second MODE line 66 high, to indicate a second data transfer mode matching the four megabyte disk cartridge 10'. Both MODE lines 64 and 66 are low to indicate a third data transfer mode matching the one megabyte disk cartridge 10".

The MODE lines 64 and 66 are connected not only to the read/write circuit 52 but also to first 76 and second 78 exclusive OR gates, respectively. The exclusive OR gates 76 and 78 have other inputs connected to the output lines 48 and 50 of the disk sensors 32 and 34, respectively. The outputs of the exclusive OR gates 76 and 78 are connected to an OR gate 80 and thence to one of the two inputs of another OR gate 82, the other input of which is connected to the output line 46 of the write protect sensor 32.

The DRIVE SELECT line 68 is normally used for selecting one of two or more disk drives which are daisy chained to a common host system. When only one disk drive is connected to the host system, as in the case illustrated here, the DRIVE SELECT signal is normally low to permit data transfer with the loaded disk cartridge. The DRIVE SELECT line 68 is connected directly to both of the read/write circuit 52 and a known disk change signal generator circuit 84 and, via a NOT circuit 86, to a NAND gate 88.

The WRITE PROTECT line 70 connects the NAND gate 88 to the controller 56 for sending a WRITE PROTECT signal from the former to the latter. The WRITE PROTECT signal is low for inhibiting writing on the loaded disk cartridge 10, 10' or 10", and high for permitting writing thereon.

The DISK CHANGE line 72 connects the disk change signal generator circuit 84 to the controller 56 for sending the usual DISK CHANGE signal from the former to the latter.

The "READY" line 74 connects the output of a known "ready" circuit 90 to the controller 56.

At 92 in FIG. 4 is seen a disk detector circuit for sensing the loading of either of the three different types of disk cartridges 10, 10' and 10" in the disk drive 24 on the basis of the outputs from the two disk sensors 34 and 36. The disk detector circuit 92 comprises an AND gate 94 having two inputs connected to the output lines 48 and 50 of the two disk sensors 34 and 36. The output of the AND gate 94 is connected to both disk change signal generator circuit 84 and "ready" circuit 90.

The "ready" circuit 90 has an additional input for receiving a signal indicative of the fact that the speed of rotation of the disk 12, 12' or 12" of the loaded disk cartridge 10, 10' or 10" has built up to a predetermined value at which data transfer may be started. Thus the "ready" circuit 90 delivers to the controller 56 a READY signal when the disk drive 24 is ready for the commencement of the reading or writing of data on the loaded disk cartridge. The disk change signal generator circuit 84 holds the output from the disk detector circuit 92 and puts out a DISK CHANGE signal in response to the DRIVE SELECT signal from the controller 56.

Operation

Figure 6:
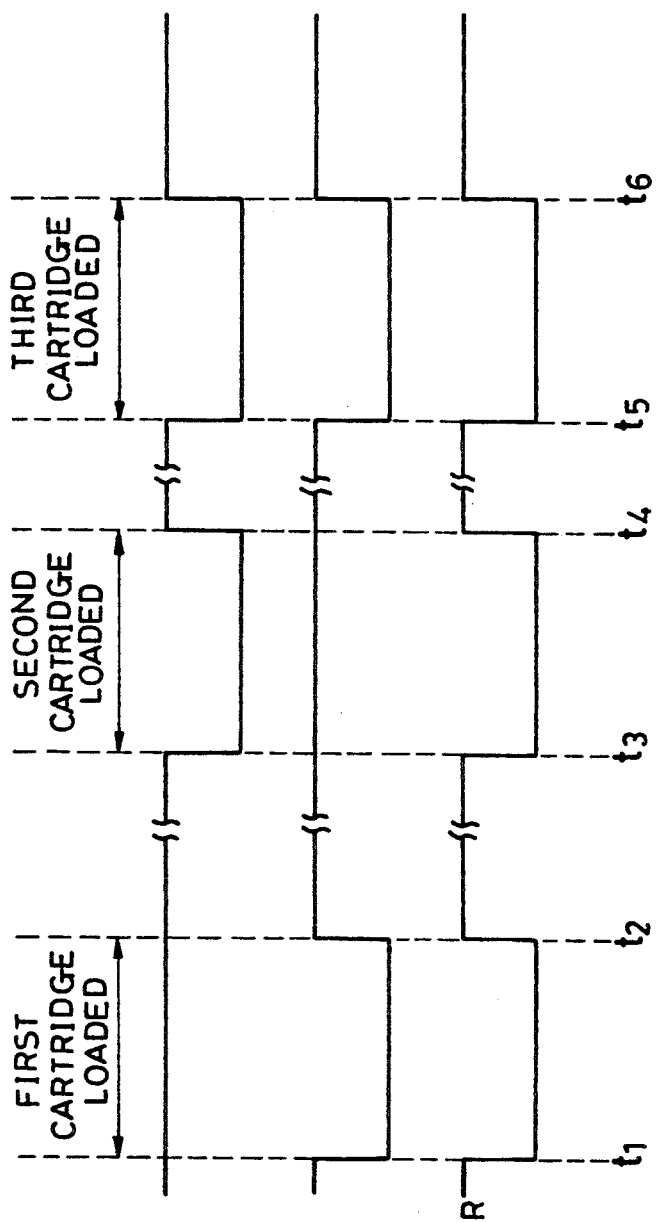
FIG. 6, consisting of (A)-(C), is a series of waveform diagrams useful in explaining the operation of the FIG. 4 system.

Let us assume that the two megabyte disk cartridge 10 of FIG. 1 is loaded in the disk drive 24 as shown in FIG. 4. The first disk sensor 34 will then remain off as its actuator enters the capacity discriminate window 18 in the housing 14 of the disk cartridge 10. The second disk sensor 36, on the other hand, will then be turned on as its actuator is depressed by the cartridge housing 14. Thus, as indicated in FIG. 6, the first disk sensor 34 will remain high whereas the second disk sensor 36 will go low as at a time $t_1$. Consequently, the AND gate 94 of the disk detector circuit 92 will go low and remain so as long as the two megabyte disk cartridge 10 remains loaded in the disk drive 24, as from time $t_1$ to time $t_2$ in FIG. 6.

When the four megabyte disk cartridge 10' of FIG. 2 is loaded in the disk drive 24, the first disk sensor 34 will then be turned on as its actuator is depressed by the housing 14' of the disk cartridge 10'. The second disk sensor 36 will then remain off as its actuator enters the capacity discriminate window 18' in the cartridge housing 14'. Thus the first disk sensor 34 will go low, as at a time $t_3$ in FIG. 6, whereas the second disk sensor 36 will remain high. The AND gate 94 will therefore go low and remain so as long as the four megabyte disk cartridge 10' remains loaded in the disk drive 24, as from time $t_3$ to time $t_4$ in FIG. 6.

Upon loading of the one megabyte disk cartridge 10" of FIG. 3 in the disk drive 24, both first and second disk sensors 34 and 36 will be turned on as their actuators are both depressed by the housing 14" of the disk cartridge 10". Therefore, both disk sensors 34 and 36 will go low as at a time $t_5$ in FIG. 5, so that the AND gate 94 will also go low and remain so as long as the one megabyte disk cartridge 10" remains loaded in the disk drive 24, as from time $t_5$ to time $t_6$ in FIG. 6.

Both disk sensors 34 and 36 will be off when no disk cartridge is loaded in the disk drive 24, as before the time $t_1$, during the time intervals $t_2$-$t_3$ and $t_4$-$t_5$, and after the time $t_6$ in FIG. 6. The output from the disk detector circuit 90 will be high during all such times. It can therefore be known from the disk detector circuit output whether any of the disk cartridges 10, 10' and 10" is loaded in the disk drive 24 or not.

The pair of exclusive OR gates 76 and 78 and the OR gate 80 constitute in combination an agreement finding circuit for finding whether the loaded disk cartridge 10, 10' or 10" matches the data transfer mode specified by the two bit MODE signal on the pair of MODE lines 64 and 66. The agreement finding circuit puts out a signal for permitting writing on the loaded disk cartridge if: (a) the two megabyte disk cartridge 10 is loaded when the MODE signal indicates the first data transfer mode; (b) the four megabyte disk cartridge 10' is loaded when the MODE signal indicates the second data transfer mode; and (c) the one megabyte disk cartridge 10" is loaded when the MODE signal indicates the third data transfer mode. Of course, the permission signal is sent to the controller 56 only when the loaded disk cartridge is not protected against writing.

Possible Modifications

Although we have shown and described the compatible data processing apparatus of our invention in terms of but one currently preferred form thereof, we do not wish our invention to be limited by the exact details of the illustrated embodiment. The following, then, is a brief list of possible modifications, alterations and adaptations of the foregoing disclosure which we believe all fall within the scope of our invention:

1. The principles of our invention may be applied to data processing systems for use with two, or four or more, different types of disk assemblies.

2. The outputs from the disk sensors 34 and 36 may be sent directly to the controller 56.

3. Optical devices could be employed as the disk sensors 34 and 36 and the write protect sensor.

4. The disk detector circuit 92 could be constituted of logic circuit elements other than the AND gate 94.

5. The disk sensors 34 and 36 could be so constructed as to provide low outputs upon detection of the capacity discriminate windows 18 and 18' in the disk cartridges 10 and 10'. The disk detector circuit 92 might then be constituted of an OR gate.

6. An additional sensor might be employed for detecting the loading of a disk cartridge in the disk drive 24, and the outputs of the additional sensor and the disk detector circuit of our invention may be both send to an AND gate, in order to make doubly sure the detection of disk loading.

What we claim is:

1. In a disk storage apparatus having a transducer for writing and reading data on first, second and third replaceable disk assemblies of different storage capacities at first, second and third data transfer rates, respectively, each disk assembly having a disk enclosed in a housing, the first and second disk assemblies having a first and second capacity discriminate window, respectively, formed in different prescribed positions in the housings thereof by way of contradistinction from each other and from the third disk assembly, which has no such capacity discriminate window, the improvement comprising:

(a) a first disk sensor for sensing a loading of the first disk assembly in the apparatus by detecting the first capacity discriminate window thereof, and sensing a loading of the third disk assembly, the first disk sensor providing a binary output indicative of the presence or absence of the first capacity discriminate window, the first disk sensor comprising a first on-off switch having a switch actuator to be received in the window of the first disk assembly loaded in position within the apparatus and an output line, the first on-off switch being normally open and being connected between ground and the output line thereof;

(b) a second disk sensor for sensing a loading of the second disk assembly in the apparatus by detecting the second capacity discriminate window thereof, and sensing the loading of the third disk assembly, the second disk sensor providing a binary output indicative of the presence or absence of the second capacity discriminate window, the second disk sensor comprising a second on-off switch having a switch actuator to be received in the window of the second disk assembly loaded in position within the apparatus and an output line, the second on-off switch being normally open and being connected between ground and an output line thereof;

(c) a supply terminal connected to the output lines of the first and second switches; and (d) a disk detector circuit connected to the output lines of the first and second switches for detecting the loading of any one of the first, second and third disk assemblies in the apparatus on the basis of the binary outputs from the first and second disk sensors;

(e) whereby the apparatus requires no sensor devoted exclusively for the detection of the loading of any one of the first, second and third disk assemblies in the apparatus.

2. The apparatus of claim 1 wherein the detector circuit is an AND gate.

* * * * *